United States Patent [19]

Clark, Jr. et al.

[11] Patent Number: 5,083,003
[45] Date of Patent: Jan. 21, 1992

[54] ADAPTIVE STEPPER

[75] Inventors: Charles A. Clark, Jr.; Wen T. Kuo, both of Chatsworth; Hyon O. Wu, Canoga Park, all of Calif.

[73] Assignee: Square D Company, Palatine, Ill.

[21] Appl. No.: 538,826

[22] Filed: Jun. 15, 1990

[51] Int. Cl.⁵ .............................................. B23K 11/24
[52] U.S. Cl. .................................................... 219/110
[58] Field of Search ....................... 219/110, 114, 117.1

[56] References Cited

U.S. PATENT DOCUMENTS

| | | | |
|---|---|---|---|
| 3,591,764 | 7/1971 | Taran | 219/110 |
| 4,419,560 | 12/1983 | Zurek | 219/110 |
| 4,447,700 | 5/1984 | Cohen | 219/110 |
| 4,456,810 | 6/1984 | Schumacher et al. | 219/110 |

Primary Examiner—Clifford C. Shaw
Attorney, Agent, or Firm—Blakely, Sokoloff, Taylor & Zafman

[57] ABSTRACT

An adaptive stepper for adjusting welding heat boost to compensate for deterioration (flattening) of the electrode tips of a welder. Heat boost is provided to the welder as a function of expulsion rather than by a series of linear step profiles specified by a weld engineer. An operator sets up an adaptive schedule based upon an expected resistance difference between consecutive half-cycles considered to be "normal." If differences equal to or less than the normal level are detected during a group of welds, the heat boost will be incremented by 1% after a preprogrammed number of welds have been made. If differences greater than normal are detected, indicating expulsion, the boost will be decremented immediately by 1% between increases, if decrements are allowed at the time.

50 Claims, 2 Drawing Sheets

ADAPTIVE STEPPER

BACKGROUND OF THE INVENTION

1. Field of the Invention

The present invention is directed to an adaptive stepper for use in conjunction with a weld controller to control the amount of heat boost which is supplied to the electrodes of a welder.

2. Description of the Prior Art

Weld controllers in the prior art employ a manual stepper to adjust heat boost, typically, as a series of linear step profiles specified by a weld engineer. More particularly, a conventional or manual stepper increases or decreases the heat boost in one percent increments as a function of the number of welds made with a set of electrodes. By way of contrast, the invented adaptive stepper decreases heat boost as a function of expulsions and the current heat boost, and increases heat boost as a function of welds made, the current heat boost and expulsions. That is, the invented adaptive stepper differs from a conventional stepper in that heat boost is determined by the weld controller as a function of expulsion, welds made and the current heat boost, rather than by a series of linear step profiles specified by a weld engineer.

U.S. Pat. No. 4,446,810 teaches an adaptive schedule weld controller system wherein welding current is reduced if the time rate resistance change between the welding electrodes exceeds a maximum predetermined value and increases the welding current if the resistance change is less than a minimum predetermined value. Additionally, the weld current may be turned off when a decrease in resistance from a peak resistance value has reached a predetermined percentage of the peak resistance value, or after a predetermined number of current cycles have been completed. However, while the method taught by U.S. Pat. No. 4,456,810 varies the weld current as a function of computed resistance at the electrodes, and can terminate the weld current as a function of the number of welds made, it differs from the present invention in that the method taught in the patent does not take into account the history of the electrodes when increasing or decreasing heat boost. For example, unlike the present invention, the patent does not include the current heat boost or the welds made count for the electrodes.

SUMMARY OF THE INVENTION

An adaptive stepper according to the present invention adjusts the welding heat boost to compensate for deterioration (flattening) of the electrode tips of a welder. The invented adaptive stepper differs from manual or conventional steppers known in the prior art in that heat boost is provided to the welder as a function of expulsion rather than by a series of linear step profiles specified by a weld engineer. An operator sets up an adaptive schedule based upon an expected resistance difference between consecutive half-cycles considered to be "normal." If differences equal to or less than the normal level are detected during a group of welds, the heat boost will be incremented by 1% after a preprogrammed number of welds have been made. If differences greater than normal are detected, indicating expulsion, the boost will be decremented immediately by 1% between increases, if decrements are allowed at the time.

DETAILED DESCRIPTION OF THE INVENTION

Figure 1:
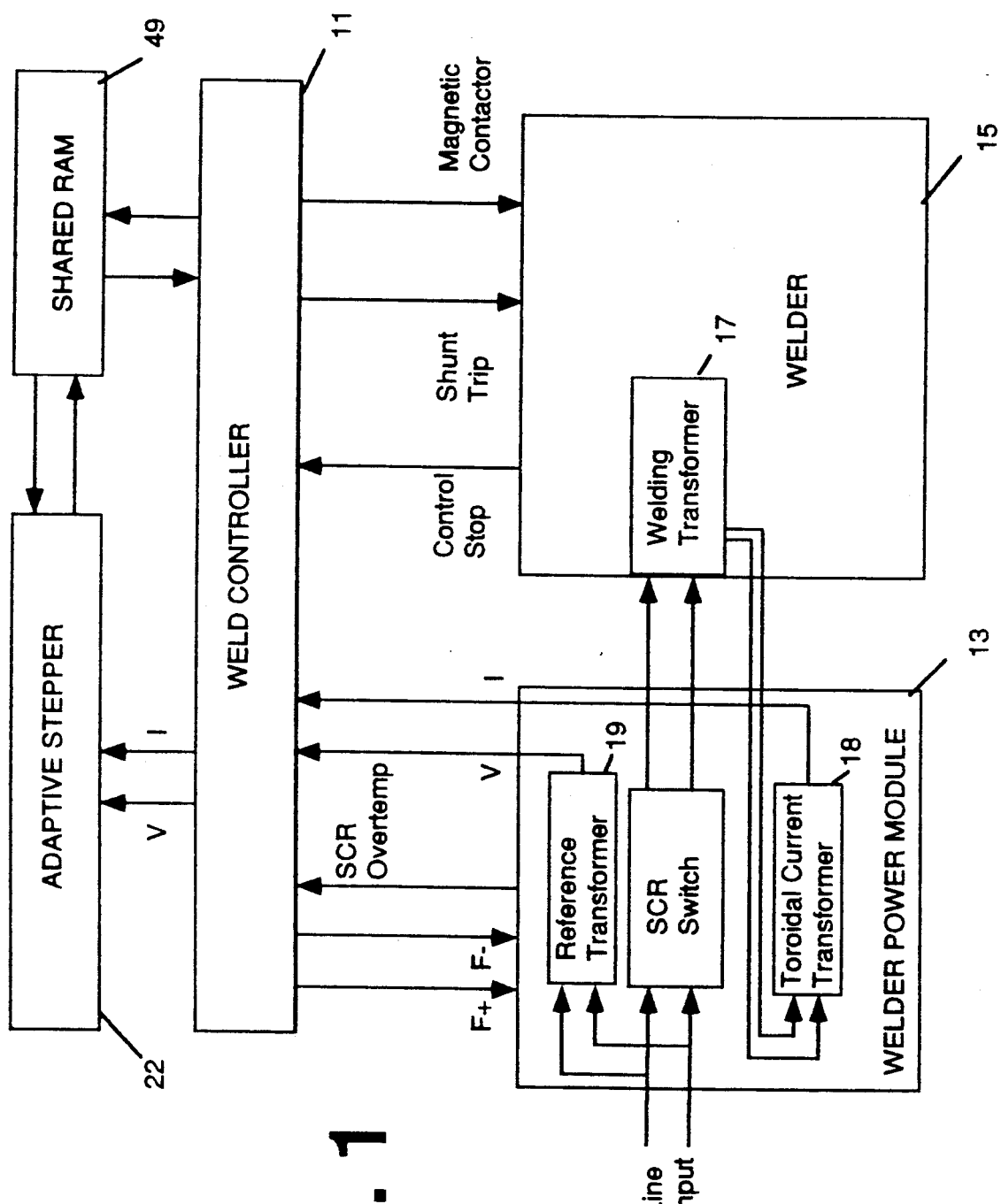
FIG. 1 is a block overview diagram showing a welder and weld controller system which utilize an adaptive stepper.

The present invention is directed to an adaptive stepper which is used by weld controllers, including rack mountable weld controllers of the type disclosed in U.S. Pat. No. 4,945,201 issued on July 31, 1990.

A conventional or manual stepper increases or decreases the heat boost in one percent increments as a function of the number of welds made with a set of tips. By way of contrast, the invented adaptive stepper decreases heat boost as a function of expulsions and the current heat boost, and increases heat boost as a function of welds made, the current heat boost and expulsions. That is, the invented adaptive stepper differs from a conventional stepper in that heat boost is determined by the weld controller as a function of expulsion, welds made and the current heat boost, rather than by a series of linear step profiles specified by a weld engineer.

The adaptive stepper automatically decreases the heat boost if expulsion is detected in two consecutive welds following the heat boost increase and if the decrement of heat boost is allowed during the stage in which the expulsion is detected. In addition, during one stage (stage 3), the adaptive stepper increases the rate at which heat boost is applied if no expulsion occurs for a preprogrammed number of welds made.

The terms "expulsion," "blanking," and "heat boost" are needed to be explained in order to obtain a proper understanding of the operation of the adaptive stepper.

Expulsion

A significant drop in resistance at the primary of the weld transformer is considered as an indication of expulsion, also known as spitting. During expulsion, molten material is blown away from the weld zone, usually indicating that too much heat is being used. The adaptive stepper monitors resistance changes at the primary of the weld transformer on every half cycle of welding, both positive and negative. The drop threshold is programmable.

Blanking

A significant resistance drop is almost always observed during the first few cycles of a weld whether expulsion occurs or not. The adaptive stepper automatically blanks the first two cycles of a weld, meaning that the adaptive stepper ignores any significant resistance drop during these cycles.

Also, if a slope instruction is used, all slope cycles are automatically blanked. (A slope instruction is an instruction which linearly increases heat from a specified starting level to a specified finish level in a specified number of cycles, e.g., 10 cycles slope 0% to 20%.) Slope is used to move the galvanized coating on some metals out of the weld zone prior to creating the weld nugget. For example, if 8 cycles of slope from 30% to 55% are used, the adaptive stepper will blank all 8 cycles. Slope is usually used when welding galvanized steel, and the blanking feature prevents the stepper from looking for expulsions while melting the galvanized coating on the steel. If the succeeding welds following the first slope are continuous welds (no non-heat cycles between the weld instructions), the adaptive stepper will not apply any blanking cycles. The adaptive stepper will apply blanking cycles (typically two) at the beginning of all succeeding welds if they employ interruptions (as in impulse welding where cool cycles are used).

Heat boost

Heat boost is an increase or decrease that is added to the programmed heat in 1% increments as the adaptive stepper operates.

Less heat is usually required during the early part of a weld electrode tips' life. A gradual increase in heat is required once the tips settle in. As the tips begin to deform with use, causing their effective diameter to increase, even more heat is required to maintain the required current density. The adaptive stepper accommodates these three stages of the tips' life by adopting a unique heat boost decision process for each stage of the tips' life.

The first 500 welds are considered as the first stage. During this stage, the heat boost is incremented by 1% after a programmed number of welds have been made. This programmable number of welds is called UPCOUNT. The adaptive stepper monitors expulsion every weld during this stage. If two consecutive welds with expulsion occur, the heat boost is decremented by 1%, but this heat boost can never be less than −10%.

The second stage begins when the welds made count exceeds 500 and remains in effect until the heat boost reaches a programmable percentage. This percentage defaults to 25%.

During the second stage, the heat boost is still incremented by 1% every UPCOUNT welds made; however, the adaptive stepper monitors for expulsion only immediately after the heat boost is incremented. After a heat boost increase, the adaptive stepper monitors the first five welds or the first UPCOUNT welds, whichever is smaller. If two consecutive welds with expulsion occur during these welds, the heat boost is decremented by 1%. The heat boost will only be decremented once even though all five welds may have generated expulsion. This prevents the heat boost from going below the limit that started this stage. If no expulsion occurs, the heat boost remains the same until the next UPCOUNT welds are made. If expulsion occurs after the first five welds, the heat boost will not be decremented.

The second stage algorithm is based on the fact that as the tips wear out, though more heat boost is required, expulsion should not occur except immediately after an increase in heat. If expulsion does occur after the first five welds following an increase, it will more likely be due to changes in welding environment (i.e., pressure, fit-up) rather than the welding heat.

The third stage begins when the heat boost exceeds the programmable limit for the second stage (default 25%). This is the stage which usually requires more rapid heat boost. The heat boost is incremented or decremented by 1%, as in the second stage. The major difference from the second stage is the automatic UPCOUNT adjustment. The adaptive stepper will automatically decrement the UPCOUNT by 10% of the UPCOUNT or by 1, whichever is larger, if no expulsion occurs for the last three UPCOUNT welds made. This causes the heat boost to be increased more rapidly as the tips near the end of their life. At the beginning of stage 3 an "Approaching End of Stepper" error will be generated and an "End Of Stepper" error will be generated when the total of schedule heat and heat boost reaches 91%.

As an example, if 10 is used for UPCOUNT, and 30 welds are made (3×UPCOUNT welds) without expulsion, the next heat boost increase will occur after 9 more welds rather than after 10 more welds. If these 9 welds are made without expulsion, the next heat boost increase will occur after 8 more welds. If expulsion does occur during these 9 welds, the next heat boost increase will occur after 9 welds. Once expulsion occurs, the adaptive stepper does not decrease the UPCOUNT until 3 consecutive UPCOUNT welds are made with no expulsion.

Programmable Parameters

The adaptive stepper program accepts 4 programmable parameters—expulsion coefficient, up event count, third stage begin percentage and end of stepper heat percentage. These parameters define the expulsion sensitivity, rate of the heat boost, where stage 2 ends and stage 3 begins and the percentage heat limit for the "End Of Stepper" error.

1. Expulsion Coefficient (sensitivity)

This parameter specifies the resistance drop in one cycle for an indication of expulsion. If resistance decreases from that of the previous cycle by more than this parameter, the weld controller assumes that expulsion has occurred. Typical values are 20 for galvanized material and 50 for uncoated steel (0.030"–0.060").

2. Up Event Count

This parameter described above as UPCOUNT controls the rate of increase of the heat boost by the adaptive stepper. Each time the count of welds made increases by UPCOUNT from the count when the last heat boost increase was made, the heat boost will be incremented by one percent. If UPCOUNT is set to zero, the heat increment function is disabled.

3. Third Stage Begin Percentage

This parameter controls the amount of heat boost that must be present for the second stage to end and the third stage to begin. The default value is 25%. This is also the heat boost level at which an "Approaching End of Stepper" error is generated.

4. End of Stepper Heat Percentage

This parameter is the total schedule heat plus heat boost percentage that must be reached before the "End of Stepper" error is generated. The default value is 91%.

In the preferred embodiment, the circuitry and software required for the invented adaptive stepper reside on a coprocessor board located within a subassembly of the weld controller. The welding transformer primary current (i) and primary voltage (v) are used as feedback signals for control of the stepper boost heat level.

The co-processor board operates by computing the resistance (R) seen at the primary of the welding transformer, and recognizing expulsion by examining changes in the logarithm of the resistance. The voltage see at the primary of the welding transformer is:

$$v(t) = i(t)R + L(di(t)/dt)$$

Resistance is measured at the peak of primary current (where $di(t)/dt = 0$) in every half cycle. By sampling the current and voltage at the point where the first derivative of current is zero, the equation is reduced to Ohm's Law:

$$v = iR$$

Which can be manipulated to yield the resistance:

$$R = v/i$$

Some error is introduced by using the welding transformer primary voltage, as there is some phase shift (typically less than 2°) between the primary voltage and the secondary voltage due to imperfect coupling. In addition, the magnetizing current drawn by the welding transformer causes some error in the apparent first derivative. The combined errors are relatively small and can be ignored as long as the transformer does not approach saturation.

The algorithm used to determine whether an expulsion has occurred operates on the relative change in the logarithm of the resistance, so errors appearing as multipliers (whether first order or higher order) are cancelled out. This is particularly significant because welding transformers have a relatively large range of transformation ratios in order to provide the currents and driving voltages needed for widely ranging secondary loop inductances and resistances (due to material type, tip diameter as related to spot size requirements, etc.). Welding transformer turns ratios typically are between 16:1 and 140:1.

Resistance as seen at the primary (Rp) is related to the secondary resistance (Rs) as the square of the turns (N) ratio:

$$Rp = N^2 Rs$$

Taking the logarithm of the equation yields $$\log(Rp) = 2\log(N) + \log(Rs)$$

Since the algorithm uses the change in the log of resistance, the difference in logs (equivalent to the ratio of resistance change) for a pair of successive half cycles of welding is:

$$\log(R_{p2}) - \log(R_{p1}) = \log(R_{s2}) - \log(R_{s1})$$
$$= \log(R_{s2}/R_{s1})$$

and the terms containing the turns ratio have disappeared due to cancellation. This method greatly simplifies the software task, but does require that the hardware provide sufficient dynamic range to handle the wide ranges of voltage and current levels which may be encountered due to variations in actual implementations.

Referring now to FIG. 1, a weld controller 11 is shown which generates firing signals F+ and F- to a welder power module 13, and a shunt trip signal and magnetic contactor signal to welder 15. The weld controller receives an SCR overtemp signal, voltage (v) and current (I) signals from the welder power module and a control stop signal from welder 15. Specific implementation details of weld controller 11 may be found in U.S. patent application Ser. No. 354,590 filed May 19, 1989, now U.S. Pat. No. 4,945,201 although such implementation details are not needed for a proper understanding of the present invention. Welder power module 13 is coupled to a welding transformer 17 whose primary current is monitored by using a toroidal current transformer 18 coupled to the primary of the welding transformer and whose primary voltage is monitored by use of a reference transformer 19 which is present to monitor the incoming line voltage for the purpose of normal heat control. However, any convenient technique for monitoring the primary current and voltage may be utilized in the present invention so long as the voltage and current passed to the adaptive stepper is fairly representative of the primary current and voltage. Weld controller 11 is coupled to a circuit 22 which performs the adaptive stepper functions of the present invention as described below with reference to FIG. 2.

Figure 2:
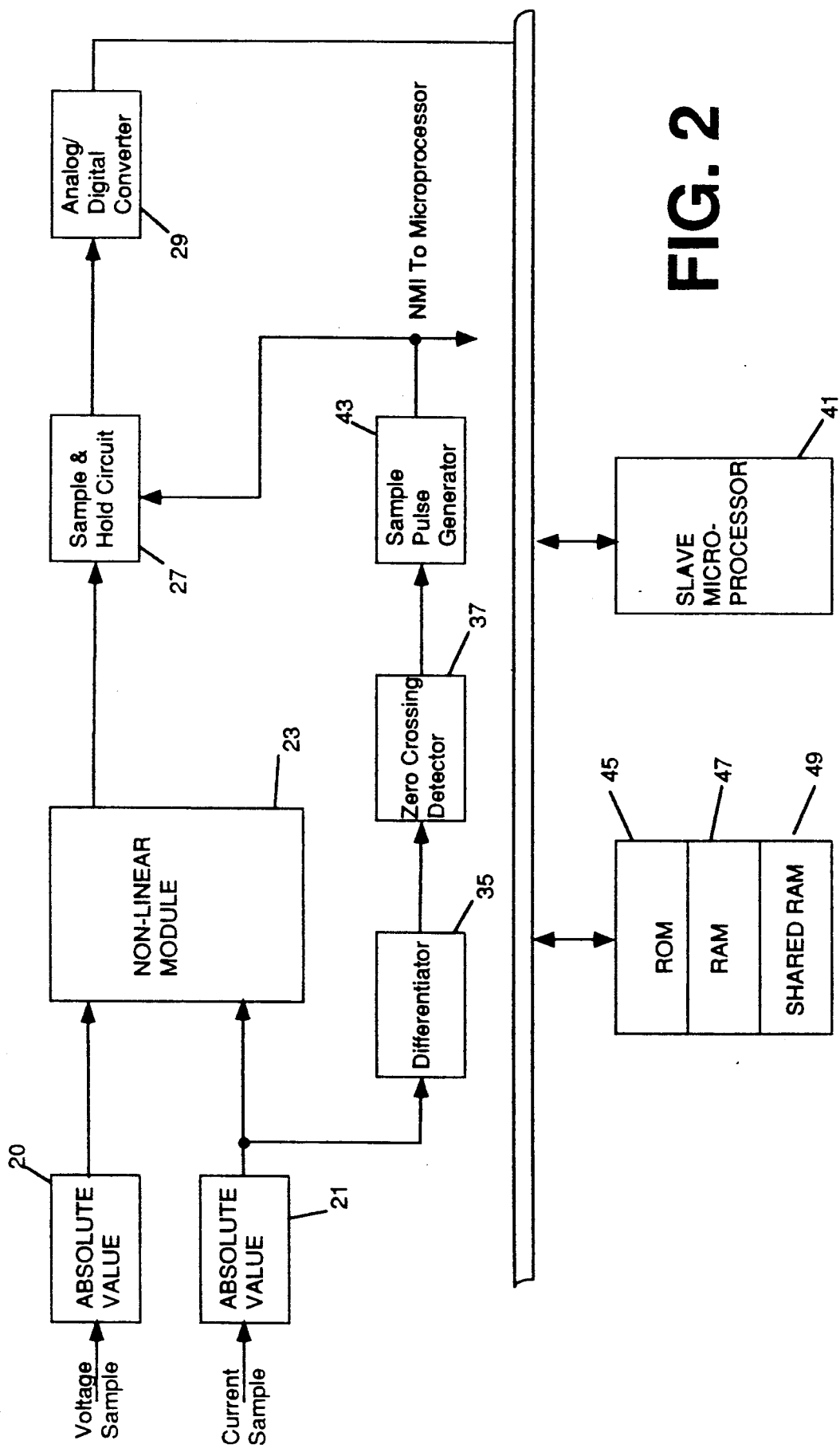
FIG. 2 is a detailed block diagram showing an implementation of an adaptive stepper according to the present invention.

Referring now to FIG. 2, the sampled voltage and current of the welding transformer are input to absolute value circuit 20 and absolute value circuit 21 respectively to convert negative voltage and current waveforms to corresponding positive values. Absolute value circuit 20 should be configured so that its output is equal in magnitude to that of the input voltage. Absolute value circuit 21 should be configured so that its output is 2.8 times that of the input current. It should be noted that the actual values chosen are for compatibility with the circuit being used. However, these values are multiplying factors and disappear when the change in the log of the resistance R is calculated. Nonlinear module 23 takes the base 10 logarithm of the voltage output by absolute value circuit 20 divided by the current output by absolute value circuit 21 multiplied by a constant to scale the result so that v/i at the minimum expected resistance is 0.05. Sample and hold circuit 27 is used to store the value Klog (v/i) generated by module 23 which is passed to analog to digital converter 29 which digitizes the value and places it on bus 31. Differentiator 35, zero crossing detector 37 and sample pulse generator 43 operate on the current output by absolute value circuit 21 generated by pulse generator 43.

The differentiator 35 and zero crossing detector 37 determine when the first derivative of current is equal to zero. The sample pulse generator 43 produces a pulse to enable the sampling function of the sample and hold circuit. The NMI (non-maskable interrupt) is an interrupt which the microprocessor must service by causing an analog to digital conversion.

The adaptive stepper shown at FIG. 2 further comprises a ROM 45, RAM 47 and shared RAM 49. ROM 45 is used to store a computer program executed by microprocessor 41 to control the operation of the adaptive stepper. RAM 47 is a scratch pad memory used by the program to store temporary values. Shared RAM 49 is a memory which is accessed in alternate cycles by microprocessor 41 and weld controller 11 and is used for passing heat adjusting parameters as calculated by the adaptive stepper to the weld controller, and from the weld controller to the adaptive stepper. In particular, the parameters passed to the weld controller are and the parameters received by the adaptive stepper from the weld controller are as follows:

| Variables controlled by the weld controller: | | |
|---|---|---|
| MPSYNC | 1 BYTE | Handshaking with Adaptive Stepper, Starts with 55 hex., If Adaptive Stepper replies with 55 hex. at CPSYNC then changes to AA hex., If Adaptive Stepper replies with AA hex. at CPSYNC then changes to FF hex., If Adaptive Stepper replies with |

|  |  | -continued |
|---|---|---|
|  |  | FF Hex. at CPSYNC then the handshaking is completed |
| WELDGOPWR | 1 BYTES | 60Hz signal polarity:<br>Non-zero value indicates positive half cycle.<br>Zero indicates negative half cycle. |
| WELDSMADE | 2 BYTES | Current welds made count. |
| NFIREANGLE | 2 BYTES | SCR firing angle at negative half cycle, 8448 = 180 deg. |
| PFIREANGLE | 2 BYTES | SCR firing angle at positive half cycle. |
| SPITLIMIT | 2 BYTES | Programmed resistance drop considered as expulsion |
| NBLANK | 1 BYTES | Number of blanking cycles per weld. |
| WELDCODE | 1 BYTE | Current opcode of weld schedule. |
| STPFLAG | 1 BYTE | Stepper flag:<br>1 = 1st stage<br>2 = 2nd stage<br>3 = 3rd stage<br>FF hex. = end of stepper |
| Variables controlled by the weld controller and adaptive stepper: | | |
| UPEVENTS | 2 BYTES | Number of welds between heat increase.<br>Initialized by weld controller<br>Updated by adaptive stepper co-processor. |
| HEATBOOST | 1 BYTE | Heat boost for next weld.<br>Initialized by weld controller<br>Updated by adaptive stepper co-processor. |
| EXPULCNT | 1 BYTE | Number of consecutive expulsion cycles.<br>Initialized by weld controller<br>Updated by adaptive stepper co-processor. |
| LASTUPCNT | 2 BYTES | Weld made count of last heat increased.<br>Initialized by weld controller<br>Updated by adaptive stepper co-processor. |
| Variables controlled by the adaptive stepper co-processor | | |
| CPSYNC | 1 BYTE | Co-processor handshaking byte. See MPSYNC. |
| NLOGR | 2 BYTES | Resistance of negative half cycle. |
| PLOGR | 2 BYTES | Resistance of positive half cycle. |
| NEG-OPCODE | 1 BYTE | Function code for negative half cycle,<br>1 = masked weld cycle<br>2 = normal weld cycle<br>3 = expulsion cycle<br>4 = SLOPE cycle |
| POS-OPCODE | 1 BYTE | Function code for positive half cycle, same code definition as NEG-OPCODE. |

An implementation of a program stored in ROM 45 used to perform the adaptive stepper function for each of the three stages is set forth below in pseudo-code form which can be easily adapted for a particular hardward environment. As shown, the program contains a main loop which calls subroutines for the three stages of operation as a function of the number of welds made and the current amount of heat boost after stage 1 operation has been completed.

Adaptive Stepper Progam Flow

```
MAIN:
WELDSMADE      DS    2    ;CURRENT WELD MADE COUNT
UPEVENTS       DS    2    ;NO. OF WELDS TO INCREASE HEAT 1%
                          ;INITIALIZED BY TIMER
LASTUPONT      DS    2    ;WELD MADE COUNT OF LAST HEAT INCREASED
EXPULONT       DS    2    ;NUMBER OF CONSECUTIVE EXPULSION
HEATBOOST      DS    2    ;CURRENT HEAT BOOST
DOWNEVENTS     EQU   2    ;EXPULSION TO DECREASE HEAT 1%
MINBOOST       EQUE  -10  ;MINIMUM HEAT BOOST = -10%
MAXBOOST       EQU   99   ;MAXIMUM HEAT BOOST = 99%
REPEAT
    IF WELDSMADE <= STAGE1COUNT            ; DEFAULT TO 500
        THEN STAGE1
        ELSE IF HEATBOOST < STAGE2PCT      ; DEFAULT TO 25
            THEN STAGE2
            ELSE STAGE3
UNTIL DONE

************** STAGE 1 ****************
STAGE1:
IF EXPULSION OCCURRED
    THEN EXPULCNT = EXPULCNT + 1
        THEN IF EXPULCNT > = DOWNEVENTS
            THEN EXPULCNT = 0
                IF HEATBOOST > MINBOOST
                    THEN HEATBOOST = HEATBOOST - 1

ELSE EXPULCNT = 0

IF WELDSMADE - LASTUPCNT > = UPEVENTS
    THEN IF HEATBOOST < MAXBOOST
        THEN HEATBOOST = HEATBOOST + 1
            LASTUPCNT = WELDSMADE

************** STAGE 2 ****************
```

```
EXPCHKEN        DS    1      ;EXPULSION CHECK ENABLE FLAG
MONITORCNT      EQU   5      ;MONITOR EXPUSION WITHIN 5 WELDS SINCE
                             ;HEAT INCREASED

STAGE2:
IF EXPULSION OCCURRED
    THEN EXPULCNT = EXPULCNT + 1
        IF EXPULCNT > = DOWNEVENTS
            THEN EXPULCNT = 0
                NOEXPULCNT = 0
                EXPCYCLE = 1
                IF EXPCHKEN > 0
                    THEN IF UPEVENTS > = MONITORCNT
                        THEN IF WELDCNT <= MONITORCNT
                            THEN HEATBOOST = HEATBOOST - 1
                                EXPCHKEN = 0
                        ELSE IF WELDCNT <= UPEVENTS
                            THEN HEATBOOST = HEATBOOST - 1
                                EXPCHKEN = 0

ELSE EXPULCNT = 0

IF WELDSMADE - LASTUPCNT > = UPEVENTS
    THEN IF HEATBOOST < MAXBOOST
        THEN HEATBOOST = HEATBOOST + 1
            LASTUPCNT = WELDSMADE
            EXPCHKEN = 1              ;ENABLE EXPULSION CHK
EXPCYCLE = 0                          ;RESET EXP. CYCLE FLAG

*************** STAGE 3 *****************

TENTHCNT        DS    2      ;1/10 OF UPCOUNT
NOEXPULCNT      DS    1      ;NUMBER OF UPCOUNT PASSED WITHOUT
                             ;EXPULSION
DECUPCNT        EQU   3      ;UPCOUNT WITHOUT EXPULSION TO DECREASE
                             ;UPCOUNT

STAGE3:
IF EXPULSION OCCURRED
    THEN EXPULCNT = EXPULCNT + 1
        IF EXPULCNT > = DOWNEVENTS
            THEN EXPULCNT = 0
                NOEXPULCNT = 0
                EXPCYCLE = 1
                IF EXPCHKEN > 0
                    THEN IF UPEVENTS > = MONITORCNT
                        THEN HEATBOOST = HEATBOOST - 1
                            EXPCHKEN = 0
                        ELSE IF WELDCNT <= UPEVENTS
                            THEN HEATBOOST = HEATBOOST - 1
                                EXPCHKEN = 0

ELSE EXPULCNT = 0

IF WELDSMADE - LASTUPCNT >= UPEVENTS
    THEN IF HEATBOOST < MAXBOOST
        THEN HEATBOOST = HEATBOOST +1
            LASTUPCNT = WELDSMADE
            EXPCHKEN = 1              ;ENABLE EXPULSION CHK
            IF EXPCYCLE = 0           ;IF NOT EXP. CYCLE
                THEN NOEXPULCNT = NOEXPULCNT + 1
                IF NOEXPULCNT > = DECUPCNT
                    THEN NOEXPULCNT = DECUPCNT
                        TENTHCNT = UPEVENTS/10
                        IF TENTHCNT < 1
                            THEN UPEVENTS = UPEVENTS - 1
                            ELSE UPEVENTS = UPEVENTS - TENTHCNT
EXPCYCLE = 0    (RESET EXP. CYCLE)
```

We claim:

1. A weld controller system for controlling the operation of a welder including a weld transformer and at least one pair of electrodes that apply current and create heat between at least two workpieces, wherein the weld controller system has a plurality of welding cycles including a preceding welding cycle, comprising:
   a) welder power means operatively connected to the weld transformer for supplying current to the electrodes and creating a predetermined amount of heat in the workpieces, wherein the workpieces have an electrical resistance;
   b) resistance determining means operatively connected to the workpieces for determining a maximum resistance which is dependent on the workpieces resistance; and,
   c) adaptive stepper means operatively connected to said resistance determining means and said welder power means for varying the amount of said heat applied to the workpieces by said welder power means, said heat variation being dependent entirely upon the value of said maximum resistance determined by said resistance determining means during the preceding welding cycle.

2. The weld controller as recited in claim 1, wherein said adaptive stepper means decreases said heat in the workpieces a predetermined increment if said maximum resistance is below a predetermined value.

3. The weld controller as recited in claim 2 wherein said predetermined increment is one percent of said heat of the workpieces during a first weld cycle.

4. The weld controller as recited in claim 1, wherein said resistance determining means computes the logarithm of said maximum resistance and said adaptive stepper means varies said heat depending upon said logarithmic resistance value.

5. The weld controller as recited in claim 1, wherein said adaptive stepper means increases said heat of the workpieces a predetermined increment after a first predetermined number of weld cycles.

6. The weld controller as recited in claim 5, wherein said predetermined increment is one percent of said heat of the workpieces during a first weld cycle.

7. The weld controller as recited in claim 1, wherein there is a first stage of weld cycles defined by the first 500 weld cycles performed by the weld controller system, wherein said adaptive stepper means increases said heat of the workpieces during said first stage a predetermined increment after a first predetermined number of weld cycles.

8. The weld controller as recited in claim 7, wherein said predetermined increment is one percent of said heat of the workpieces during a first weld cycle.

9. The weld controller as recited in claim 7, wherein said adaptive stepper means decreases said heat in the workpieces a predetermined increment if said maximum resistance is below a predetermined value.

10. The weld controller as recited in claim 7, wherein said adaptive stepper means decreases said heat in the workpieces a predetermined increment if said maximum resistance is below a predetermined value for a predetermined consecutive number of cycles.

11. The weld controller as recited in claim 10, wherein said predetermined increment is one percent of said heat of the workpieces during a first weld cycle.

12. The weld controller as recited in claim 10, wherein said predetermined consecutive number of cycles is 2.

13. The weld controller as recited in claim 10, wherein said adaptive stepper means does not reduce the amount of said heat to the workpieces less than a minimum heat value.

14. The weld controller as recited in claim 13, wherein said minimum heat value is $-10\%$.

15. The weld controller as recited in claim 7, wherein there is a second stage of weld cycles which follows said first stage of weld cycles and continues until said heat applied to the workpieces has increased a first predetermined amount greater than a first weld cycle, wherein said adaptive stepper means increases said heat of the workpieces during said second stage a predetermined increment after a first predetermined number of weld cycles.

16. The weld controller as recited in claim 15, wherein said first predetermined amount of heat increase is approximately 25% of the first weld cycle.

17. The weld controller as recited in claim 16, wherein said predetermined increment is one percent of said heat of a workpieces during the first weld cycle.

18. The weld controller as recited in claim 15, wherein said adaptive stepper means decreases said heat in the workpieces a predetermined increment if said maximum resistance is below a predetermined value.

19. The weld controller as recited in claim 18, wherein said predetermined increment is one percent of said heat of the workpieces during a first weld cycle.

20. The weld controller as recited in claim 15, wherein said adaptive stepper means decreases said heat in the workpieces a predetermined increment is said maximum resistance is below a predetermined value for a predetermined consecutive number of cycles.

21. The weld controller as recited in claim 20, wherein said predetermined increment is one percent of said heat of the workpieces during a first weld cycle.

22. The weld controller as recited in claim 21, wherein said predetermined consecutive number of cycles is 2.

23. The weld controller as recited in claim 20, wherein said resistance determining means only determines said maximum resistance either during a first predetermined number of weld cycles or a second predetermined number of weld cycles, whichever is smaller, after said adaptive stepper means increases said heat said predetermined increment.

24. The weld controller as recited in claim 23, wherein said second predetermined number of weld cycles is 5.

25. The weld controller as recited in claim 24, wherein said adaptive stepper means will only decrease said heat of the workpieces one increment during each first predetermined number of weld cycles.

26. The weld controller as recited in claim 15, wherein there is a third stage of weld cycles that follows said second stage of weld cycles and continues until said heat applied to the workpieces has increased a second predetermined amount greater than the first weld cycles, wherein said adaptive stepper means increases said heat of the workpieces during said third stage a predetermined increment after a first predetermined number of weld cycles.

27. The weld controller as recited in claim 26, wherein said second predetermined amount of heat increase is approximately 91% of the first weld cycle.

28. The weld controller as recited in claim 27, wherein said predetermined increment is one percent of said heat of the workpieces during the first weld cycle.

29. The weld controller as recited in claim 26, wherein said adaptive stepper means decreases said heat in the workpieces a predetermined increment if said maximum resistance is below a predetermined value.

30. The weld controller as recited in claim 29, wherein said predetermined increment is one percent of said heat of the workpieces during the first weld cycle.

31. The weld controller as recited in claim 26, wherein said adaptive stepper means decreases said heat in the workpieces a predetermined increment if said maximum resistance is below a predetermined value for a predetermined consecutive number of cycles.

32. The weld controller as recited in claim 31, wherein said predetermined increment is one percent of said heat of the workpieces during the first weld cycle.

33. The weld controller as recited in claim 32, wherein said predetermined consecutive number of cycles is 2.

34. The weld controller as recited in claim 31, wherein said measuring means only measures said maximum resistance either during a first predetermined number of weld cycles or a second predetermined number of weld cycles, whichever is smaller, after said adaptive stepper means increases said heat said predetermined increment.

35. The weld controller as recited in claim 34, wherein said second predetermined number of weld cycles is 5.

36. The weld controller as recited in claim 35, wherein said adaptive stepper means will only decrease said heat of the workpieces one increment during each first predetermined number of weld cycles.

37. The weld controller as recited in claim 31, wherein said first predetermined number is decreased by 1 every time the weld controller goes through a third predetermined number of weld cycles and said measuring means does not measure a maximum resistance below said predetermined value during said third predetermined number of weld cycles.

38. A weld controller system for controlling the operation of a welder including a weld transformer and at least one pair of electrodes that apply current and create heat between at least two workpieces, wherein the weld controller system has a plurality of welding cycles including a preceding welding cycle, comprising:
   a) welder power means operatively connected to the weld transformer for supplying current to the electrodes and creating a predetermined amount of heat in the workpieces, wherein the workpieces have an electrical resistance;
   b) resistance determining means operatively connected to the workpieces for determining a maximum resistance which is dependent on the workpieces' resistance; and,
   c) adaptive stepper means operatively connected to said resistance determining means and said welder power means for varying the amount of said heat applied to the workpieces by said welder power means depending upon said resistance measured by said measuring means during the preceding welding cycle, wherein said adaptive stepper means increases said heat of the workpieces a predetermined increment after a first predetermined number of weld cycles, said adaptive stepper means decreases said heat of the workpieces a predetermined increment if during said first predetermined number of weld cycles said resistance is below a predetermined value for a predetermined consecutive number of weld cycles.

39. The weld controller as recited in claim 38, wherein said predetermined increments are one percent of said heat of the workpieces during a first weld cycle.

40. The weld controller as recited in claim 39, wherein said first predetermined number of weld cycles is 10.

41. The weld controller as recited in claim 39, wherein said predetermined consecutive number of weld cycles is 2.

42. The weld controller as recited in claim 41, wherein there is a first stage of weld cycles defined by the first 500 weld cycles performed by the weld controller system, a second stage of weld cycles following said first stage of weld cycles and continuing until said heat applied to the workpieces is a first predetermined amount of a first weld cycle, and a third stage of weld cycles following said second stage of weld cycles and continuing until said heat applied to the workpieces is a second predetermined amount greater than the first weld cycle.

43. The weld controller as recited in claim 42, wherein said first predetermined amount of heat is 25% greater than the first weld cycle.

44. The weld controller as recited in claim 43, wherein said second predetermined amount of heat is 91% greater than the first weld cycle.

45. The weld controller as recited in claim 44, wherein during the first stage of weld cycles said adaptive stepper means does not reduce the amount of said heat to the workpieces less than a minimum heat value.

46. The weld controller as recited in claim 45, wherein said minimum heat value is 10%.

47. The weld controller as recited in claim 45, wherein during said second and third stage of weld cycles said measuring means only measures said maximum resistance either during a first predetermined number of weld cycles or a second predetermined number of weld cycles, whichever is smaller, after said adaptive stepper means increases said heat said predetermined increment.

48. The weld controller as recited in claim 47, wherein said second predetermined number of weld cycles is 5.

49. The weld controller as recited in claim 47, wherein said adaptive stepper means will only decrease said heat of the workpieces one increment during each first predetermined number of weld cycles.

50. The weld controller as recited in claim 49, wherein during said third stage of weld cycles said first predetermined number is decreased by 1 every time the weld controller goes through a third predetermined number of weld cycles and said measuring means does not measure a maximum resistance below said predetermined value during said third predetermined number of weld cycles.

* * * * *